United States Patent [19]
Sharp

[11] 3,869,969
[45] Mar. 11, 1975

[54] TOASTING APPARATUS

[75] Inventor: Douglas Cecil William Thomas Sharp, Midgham, England

[73] Assignee: Watermill Engineering Limited, Woolhampton, England

[22] Filed: June 25, 1973

[21] Appl. No.: 373,002

[30] Foreign Application Priority Data
July 3, 1972 Great Britain.................... 30946/72

[52] U.S. Cl............... 99/327, 99/335, 99/355, 99/386, 99/391, 99/427, 99/443 C, 126/41 C, 198/211, 219/388
[51] Int. Cl. ........................................... A47j 37/04
[58] Field of Search ............ 99/326, 327, 331, 332, 99/334, 335, 385, 386, 387, 389, 391, 393, 99/427, 443 C, 448, 352, 355; 219/388; 126/41 C; 198/211

[56] References Cited
UNITED STATES PATENTS

| 1,543,737 | 6/1925 | Thornton | 99/387 |
| 1,555,336 | 9/1925 | Vaughan | 99/386 X |
| 1,634,142 | 6/1927 | Hammond | 99/386 X |
| 2,714,348 | 8/1955 | Fokakis | 99/387 |
| 2,907,267 | 10/1959 | Lindsey | 99/389 X |
| 3,220,336 | 11/1965 | Hoover | 99/443 C |
| 3,277,813 | 10/1966 | Luscher | 99/386 |
| 3,418,920 | 12/1968 | Alexander | 99/443 C |
| 3,515,054 | 6/1970 | Sato et al. | 99/386 X |

Primary Examiner—Billy J. Wilhite
Attorney, Agent, or Firm—Lawrence E. Laubscher

[57] ABSTRACT

A toasting apparatus comprises carrier means mounted for rotation about a fixed axis, a plurality of frames circumferentially arranged on said carrier means for rotation therewith and adapted to hold items of food to be toasted. Drive means are provided for rotating said carrier means about said fixed axis such that the frames pass through a heating zone, whereat items of food loaded in the frames are toasted, to an unloading station at which said items of food are removed from said frames after toasting.

26 Claims, 12 Drawing Figures

TOASTING APPARATUS

This invention relates to toasting apparatus.

According to the invention there is provided a toasting apparatus comprising carrier means mounted for rotation about a fixed axis, a plurality of frames circumferentially arranged on said carrier means for rotation therewith and adapted to hold items of food to be toasted, drive means for rotating said carrier means about said fixed axis, a heating zone, through which said frames pass on rotation of the carrier means, for toasting items of food loaded in said frames, and an unloading station at which said items of food are removed from said frames after toasting.

In order that the invention may be well understood, some embodiments thereof, given by way of example only, will now be described, reference being had to the accompanying drawings, in which.

Figure 1:
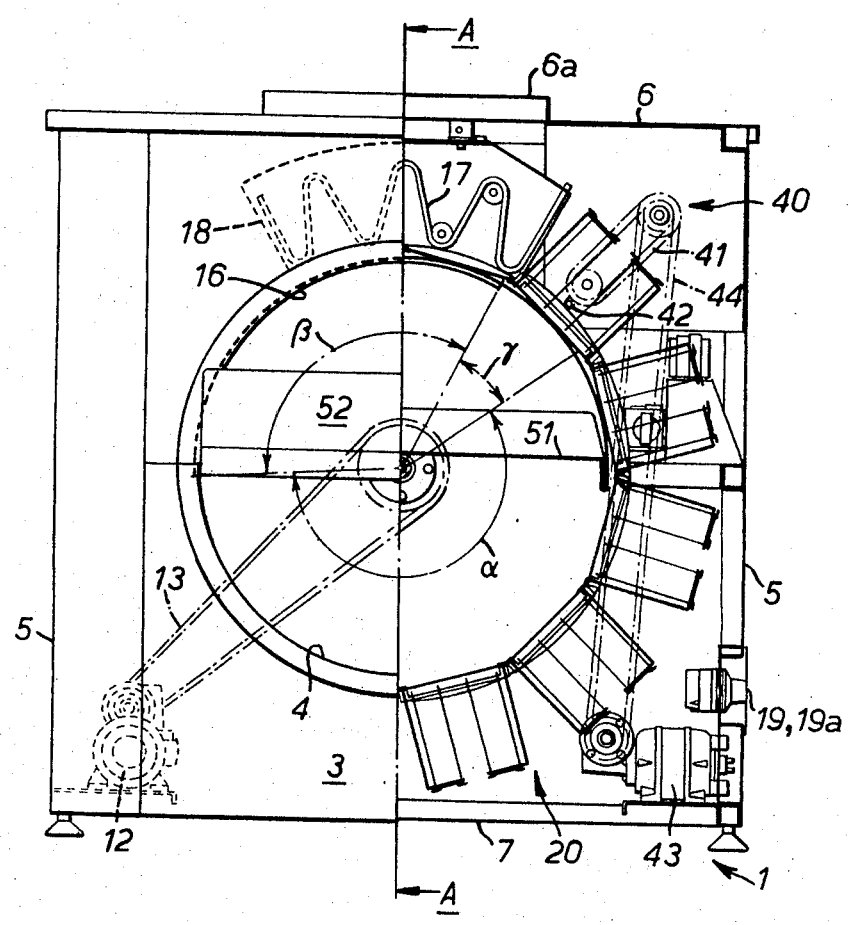
FIG. 1 is an elevation, partly in section, of an apparatus for toasting bread.
Figure 2:
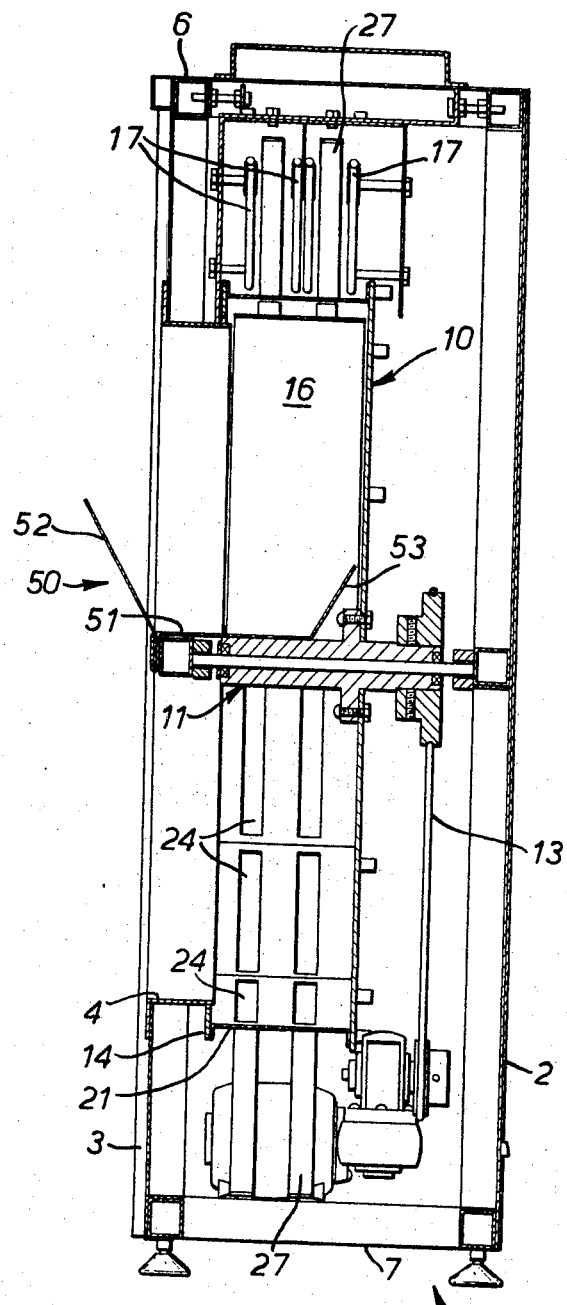
FIG. 2 is a view of the apparatus shown in FIG. 1 taken along the line A—A in FIG. 1.

Briefly, the toasting apparatus shown in FIGS. 1 and 2 comprises a drum-like structure having a plurality of peripheral frames adapted to hold slices of bread (or other food items to be toasted) and arranged to be rotated so that bread slices loaded into the frames will pass through a heating zone whereat to be toasted and thereafter to a station at which they are removed from the frames. The apparatus is preferably constructed so that slices of bread can be loaded into the frames from within the drum-like structure. Another feature of the appaaratus is that means may be provided for positively ejecting the toasted slices from the frames. A further feature is that the rotational speed of the drum-like structure can be varied to give the required degree of toasting; alternatively, the drum-like structure can be rotated at a constant speed but intermittently with the time at which the structure is stopped capable of variation to give the degree of toasted desired.

In more detail, apparatus 1 comprises a housing having a back plate 2, a front plate 3 which is provided with a central circular aperture 4, and, extending between the back plate 2 and the front plate 3, a top plate 6, a bottom plate 7, and two side plates 5.

A disc 10 is secured on a shaft 11 for rotation therewith within the housing. The shaft 11 is journalled to a framework fixed to the back plate 2. A motor 12 is mounted within the housing for driving the shaft 11 in a clockwise direction (as viewed in FIG. 1) via a belt 13.

Figure 3:
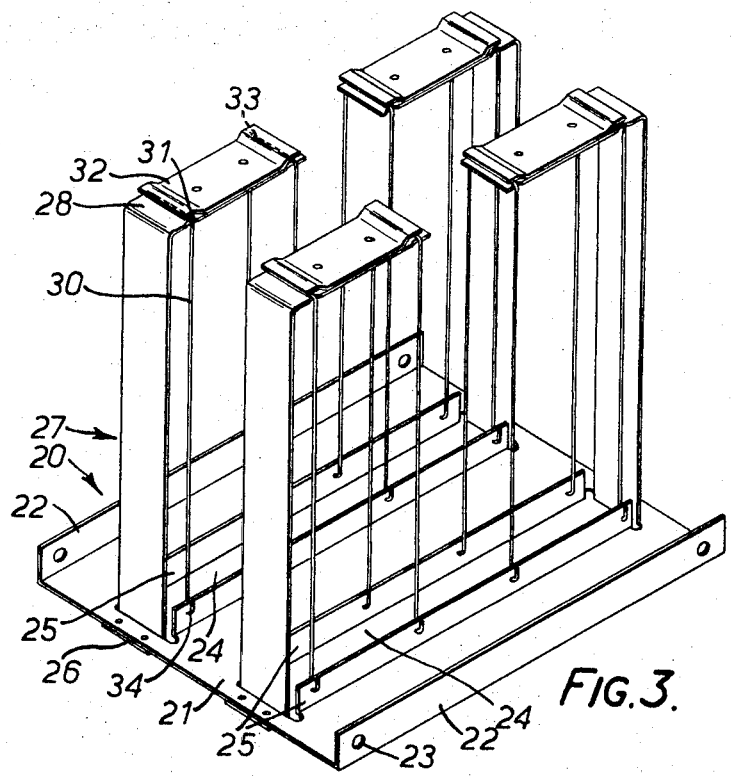
FIG. 3 is an isometric view of a frame of the apparatus shown in FIGS. 1 and 2.

Twelve circumferentially spaced frames 20, which are adapted to hold slices of bread, are mounted on the peripheral portion of the disc 10 to form a drum-like structure therewith. As shown in FIG. 3 each frame 20 is constructed to support two slices of bread and comprises a rectangular side plate 21 opposite end portions 22 of which are formed into flanges and provided with mounting holes 23 for receiving fixing members (not shown) for securing the frame to the disc 10 and to an annular member 14 (see FIG. 2) respectively. Two parallel slots 24, which form openings through which slices of bread can pass, are defined in the side plate 21 by flanges 25 which extend from the side plate 21. The flanges 25 preferably flare outwardly from each other so that passage of the slices of bread through the slots 24 is not hindered. A cage for holding a slice of bread extends perpendicularly from each slot 24 and is formed by two substantially L-shaped members 27 spot welded at securing portions 26 thereof to the side plate 21 and extending one from each end of the slot 24 with their cross-portions 28 extending inwardly parallel to the slot, and four substantially U-shaped wire members 30 located one at each end of the cross-portions 28 in notches 31 and extending to the flanges 25 of the slot. Clamping members 32 are spot welded to the cross-portions 28 to clamp the base portions 33 of the wire members 30 in position and each end portion 34 thereof is locateed in a respective hole in the flanges 25. Thus, each frame 20 can support two slices of bread parallel to the disc 10 in the cages provided.

It will be appreciated that the slices of bread are loaded into the cages of the frames from within the drum-like structure. Access to the slots 24 for loading is provided over a sector α of the drum-like structure which sector thus constitutes a loading station. A sector β adjacent the sector α includes a heating zone or chamber 18 having reflective interior surfaces and provided with four heating elements 17. A curved plate 16 is located around the aperture 4 in the sector β and extends between the front plate 3 and the back plate 2 of the housing to obturate the slots 24 of the frames 20 when they are in the sector β. The four heating elements 17 are axially spaced apart within the heating chamber 18 so that heat can be applied to each side of the slices of bread supported in the frames 20 when the frames 20 are within the heating chamber 18.

The two axially outer heating elements 17 which, for example, are rated at 850 watts are controlled by a variable output switch 19 and the two axially inner heating elements are controlled by a variable output switch 19a. The variable output swithes 19, 19a may be replaced by on-off switches (not shown) and the two axially inner heating elements may be replaced by a single heating element rated at, for example, 1,300 watts, in which case preferably three on-off switches are provided, one for each element. A cover 6a in the top plate 6 of the housing gives access to the heating elements 17.

An ejector device 40 is located at an unloading station in a sector γ of the drum-like structure between sectors α and β. The ejector device 40 comprises an endless belt or chain 41 on which there is mounted an ejector bar 42. The endless belt or chain 41 is driven in synchronism with the rotation of the disc 10 by a motor 43 via a further endless belt or chain 44 so that the ejector bar passes into and out of the space between the substantially L-shaped members 27 of the cages of each frame 20 as it passes through the sector γ (as shown in FIG. 1).

An elongate tray 50 comprising a base 51 having two inclined sides 52 and 53 is mounted transversely of the shaft 11 and secured horizonally with respect to the housing.

Operation of the apparatus will now be described. The disc 10 is driven by the motor 12 at for example 2 revolutions per minute, which will give a throughput of 720 slices per hour. The heating elements 17 are set to a predetermined output by means of the switches 19, 19a. Slices of bread to be toasted are loaded into the frames 20 in the sector α through the slots 24 via the aperture 4 in the front plate 3. It will be appreciated that the sector α provides 10 loading positions for loading slices of bread to be toasted into the frames 20. The frames 20 supporting the slices of bread pass through the heating chamber 18 in the sector β where the bread is toasted by the heating elements 17. The curved plate 16 prevents the slices of bread from falling out of the frames 20 in the sector β under gravity.

After the frames 20 pass out of the heating chamber 18 into the sector γ the slices of toasted bread are free to fall through the slots 24 into the tray 50. The ejector device 40 assists the movement of the slices of toasted bread into the tray 50, the ejector bar 42 engaging the radially outer edges of the slices of toasted bread and pushing the slices of toasted bread through the slots 24.

Figure 4:
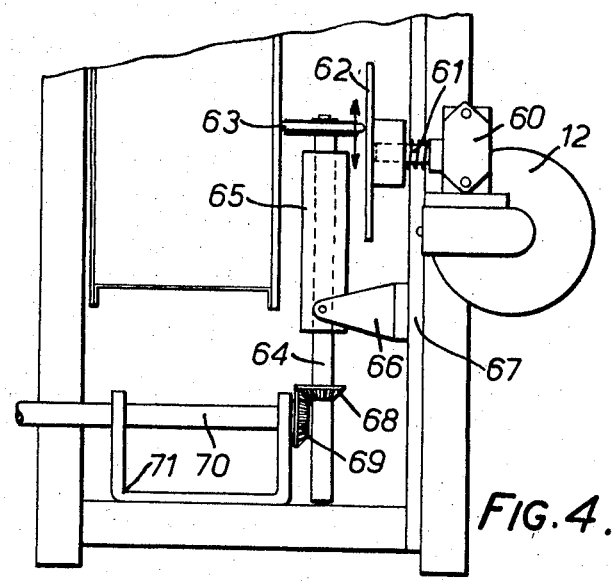
FIG. 4 shows diagrammatically an alternative drive system for the apparatus shown in FIGS. 1 and 2.

The speed of rotation of the disc 10 can be altered and, thus, the time the slices of bread are in the heating chamber 18 can be varied by altering the dimensions of the pulleys used to transmit the rotation of the motor 12 to the shaft 11. Accordingly, pre-selectably pulleys (not shown) may be provided so that the shaft 11 may be rotated at different constant speeds. Alternatively a drive system shown in FIG. 4 can be used to drive the shaft 11. Referring to FIG. 4 the motor 12 drives via a reduction gearbox 60 a shaft 61 at a speed of, for example, 5 revolutions per minute. A disc 62 is mounted for rotation with the shaft 61. A friction disc 63 mounted for rotation with a shaft 64 engages the surface of the disc 62 at right-angles thereto. The shaft 64 is supported in and is axially movable with a housing 65. The housing 65 is mounted on a slide 66 which is slidable in a guideway 67 parallel to the shaft 64. A bevel gear 68 secured for rotation with the shaft 64 is axially slidable thereon and is meshingly engaged with a bevel gear 69 of a shaft 70 which shaft 70 is supported in a bracket 71 fixed to the housing of the apparatus. The shaft 70 drives either directly or indirectly the shaft 11 (not shown in FIG. 4) of the apparatus. To vary the speed of the shaft 70 the friction disc 63 is moved in the directions of the double-headed arrow by the slide 66 so that it engages the disc 62 at a different circumference thereon. Although the shaft 64 moves with the friction disc 63 the bevel gear 68 is able to slide on the shaft 64 to maintain engagement with the bevel gear 68.

Figure 5:
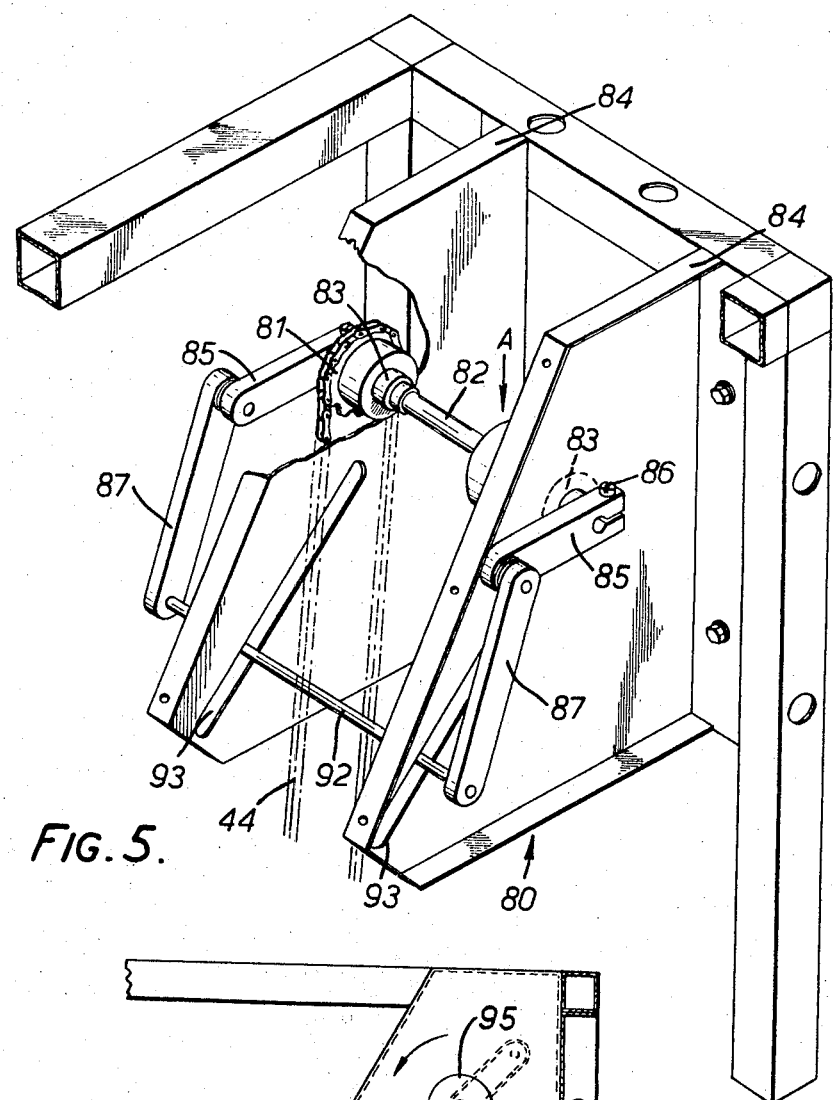
FIG. 5 shows an isometric view of an alternative ejector mechanism for the apparatus shown in FIGS. 1 and 2.
Figure 5A:
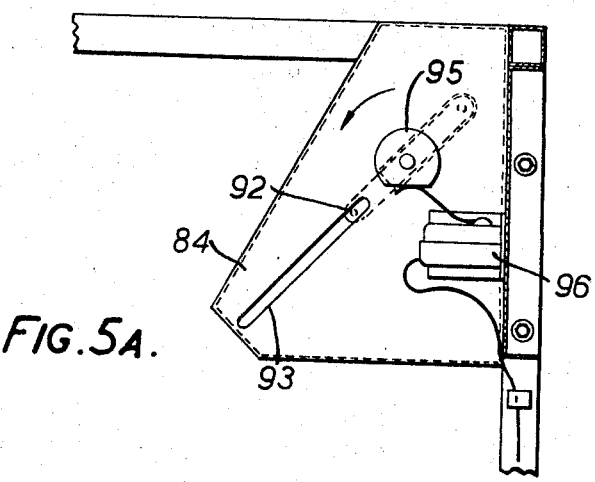
FIG. 5A shows detail A of FIG. 5.

An ejector device 80, which is an alternative to the device 40, is shown in FIGS. 5 and 5A. The ejector device 80 comprises a sprocket 81 which is engaged by the chain 44 and which is mounted fast with a shaft 82. The shaft 82 is supported by respective bearings 83 in a pair of support plates 84. The end portions of the shaft 82 extend through the support plates 84 and each end portion has one end portion of a crank arm 85 clamped thereon by means of a screw 86 for rotation with the shaft 82. The end portions of a connecting rod 87 are respectively pivotally connected to the other end portion of the crank arm 85 and to an ejector bar 92 which on rotation of the shaft 82 reciprocatingly moves along guide slots 93 provided in the support plates 84.

Figure 6:
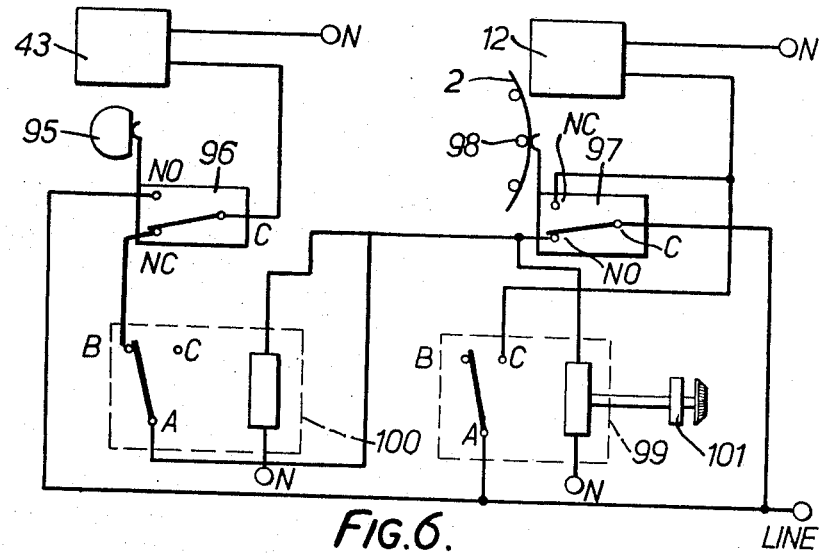
FIG. 6 shows an electric circuit for an apparatus having the ejector mechanism shown in FIG. 5.

A cam 95 (see FIG. 5A) is mounted for rotation with the shaft 82 and engages a microswitch 96 which is part of the circuit shown in FIG. 6 for controlling both the rotation of the disc 10 and the operation of the ejector device 80.

Referring to FIG. 6, circumferentially spaced apart pegs 98 are mounted on the side of the disc 10 nearest the backplate 2, there being one peg associated with each frame. A microswitch 97 is arranged to be actuated by the pegs 98 and has its normally closed terminal NC connected to the motor 12 which drives the disc 10, its common terminal C connected to Line, and its normal open terminal NO connected to the coils of delay relays 99 and 100, which coils are arranged in parallel. The delay relays are shown in their opened positions, contacts A and B being bridged. Contacts A and C are bridged when the relays close after a predetermined delay. Delay relay 99 is provided with an external potentiometer 101 which enables the delay period thereof to be selectively varied from for example 1.5 to 8 seconds. Delay relay 100 has a fixed delay period which is, typically, 0.5 seconds. Contact C of relay 99 is connected to motor 12, contact B being unused. Contact B of relay 100 is connected to the normally closed terminal NC of microswitch 96, contact C being unused. Contacts A of both relays are connected to Line.

The normally open terminal NO of microswitch 96 is connected to Line and the common terminal C thereof is connected to the motor 43. Neutral connections are made to the two motors 12 and 43 and to the coils of the delay relays 99 and 100 as shown.

The sequence of operations of the circuit will now be described. With the normally closed terminal NC of the microswitch 97 connected to the common terminal C thereof the motor 12 is connected to Line and rotates the disc 10. The motor 43 is not connected to Line and is, therefore, stationary. Rotation of the disc 10 causes one of the pegs 98 to engage the microswitch 97 and cause the normally open terminal thereof NO to be connected to the common terminal C thereof, as shown in FIG. 6. This causes the motor 12 to stop rotating and the coils of the delay relays 99, 100 to be energised. The motor 43 is started by being connected to Line through microswitch 97, contacts A and B of delay relay 100, and microswitch 96 which, as shown in FIG. 6, has its normally closed terminal NC connected to its common terminal C. The motor 43 rotates the sprocket 81 of the ejector device 80 via the chain 44 at, typically, 1 revolution per second and causes the ejector bar 92 to push slices of bread through the slots 24 in a similar manner to the ejector bar 42 of device 40 described hereinbefore. Rotation of the cam 95 with the shaft 82 causes the normally open terminal NO of the microswitch 96 to be connected to the common terminal C thereof after a time interval which is less than 0.5 seconds, i.e. the delay period of relay 100, so that the motor 43 is connected to Line directly through the microswitch 96. After the delay period of relay 100 the contact B thereof becomes disconnected from the contact A thereof. After 1 revolution of the sprocket 81 (i.e. after 1 second from energisation of the motor 43) the flat on the cam 95 engages the microswitch 96 and restores the same to its initial position in which the normally closed terminal NC is connected to the common terminal C. The motor 43 stops as there is no Line connection thereto.

When the preset delay period of relay 99 has expired the contacts A and C thereof are bridged and, thus, the motor 12 is connected to Line. The motor 12 rotates and the peg 98 disengages the microswitch 97 restoring the connection between the normally closed terminal NC and the common terminal C thereof so that the motor 12 is connected directly to Line through the microswitch 97. As the microswitch 97 no longer connects the coils of the delay relays to Line the relays are restored to their opened positions, contacts A and B thereof being bridged. Upon engagement of the microswitch 97 by the next peg after further rotation of the disc 10 the above-described sequence of operations will be repeated whereby the frames 20 are indexed into the heating chamber 18 one at a time.

It will be appreciated that when the motor 12 is not rotating the bread held in the heating chamber 18 is toasted for a time controlled by the potentiometer 101 which can therefore be used to vary the degree of browning of the toast. In practice, the average rotational speed of the disc 10 is adjusted to be about 2 revs/min.

Figure 7:
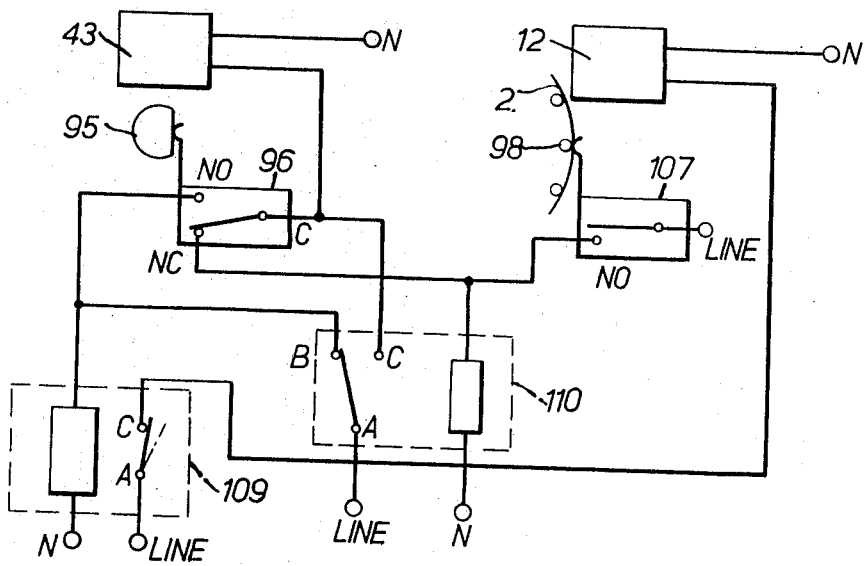
FIG. 7 shows an alternative electric circuit to that shown in FIG. 6.

In an alternative circuit shown in FIG. 7 the motor 12 for driving the disc 2 is connected to line by way of the contacts A and C of a delay relay or timer 109 when the coil thereof which is energised through a single pole double throw relay 110 has caused the contacts A and C to be bridged. A pulsing microswitch 107 is arranged to be actuated by the pegs 98 on the disc 2 for connecting the coil of the relay 110 and the normally closed terminal NC of microswitch 96 to Line. Thus, when one of the pegs 98 engages the microswitch 107, the relay 110 moves to its closed position, contacts A and C thereof being bridged, and the coil of the timer 109 is de-energised thus causing the Line connection to the motor 12 to be interrupted. After the duration of the pulse from the microswitch 107 the relay is maintained in its energised condition by Line voltage supplied through its own contacts A and C and through the microswitch 96 which is in its normally closed position (as shown in FIG. 7). The contact C of the relay 110 is connected to the motor 43 and therefore energisation of the relay also energises the motor 43 to drive the ejector bar 92. Rotation of the cam 95 with the motor 43 switches the microswitch 96 so that its normally open terminal NO and common terminal C are bridged after the ejector bar 92 has operated. This switching of the microswitch disconnects the supply of Line voltage to the motor 43, which ceases to be driven, and the coil of the relay 110, which is de-energised and connects the coil of the timer 109 to Line. Although the relay 110 returns to its de-energised state the connection of the coil of the timer 109 to Line is maintained through the relay 110 by way of contacts A and B thereof. The contacts A and C of the timer are bridged to reconnect the motor 12 to Line a predetermined time after the coils thereof has been connected to Line which time is controlled by a potentiometer (not shown) of the timer. The disc 2 will then rotate until the next peg actuates the microswitch 107 when the above-described sequence will recommence. As in the FIG. 6 circuit the potentiometer can be used to vary the degree of browning of the toast by controlling the time the motor 12 is stationary and thus the time the bread is held in the heating chamber.

It will be appreciated that the degree of browning of the toast in the apparatus shown in FIGS. 1 and 2 can be altered by varying (a) the output of the heating elements 17 by adjusting the switches 19, 19a if these are provided; and (b) the average speed of rotation of the disc 10. The latter can be realized, when the disc is constantly rotated by (a) changing the pulleys used for driving the disc; or (b) using a variable speed drive system as shown in FIG. 4; and, when the disc is intermittently rotated, by (c) varying the time that the disc is stationary during a revolution thereof.

Figure 8:
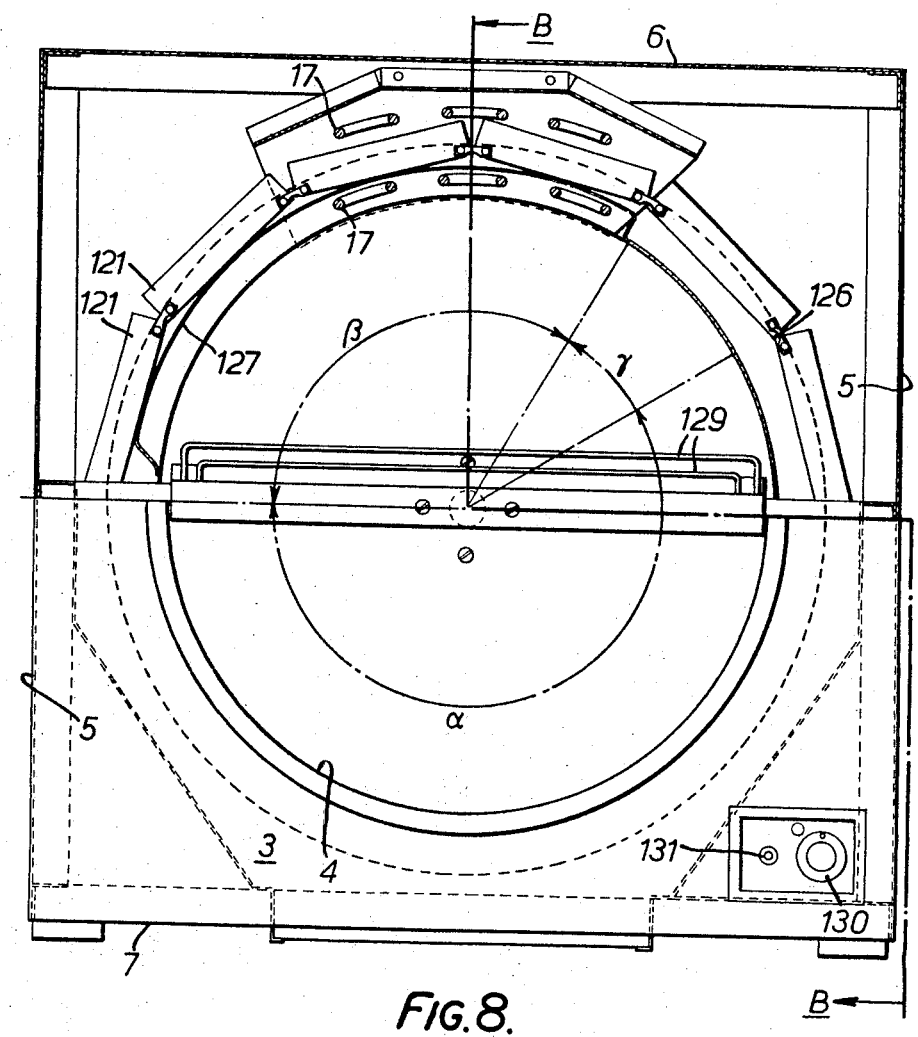
FIG. 8 is an elevation of a variant of the apparatus shown in FIGS. 1 and 2.
Figure 9:
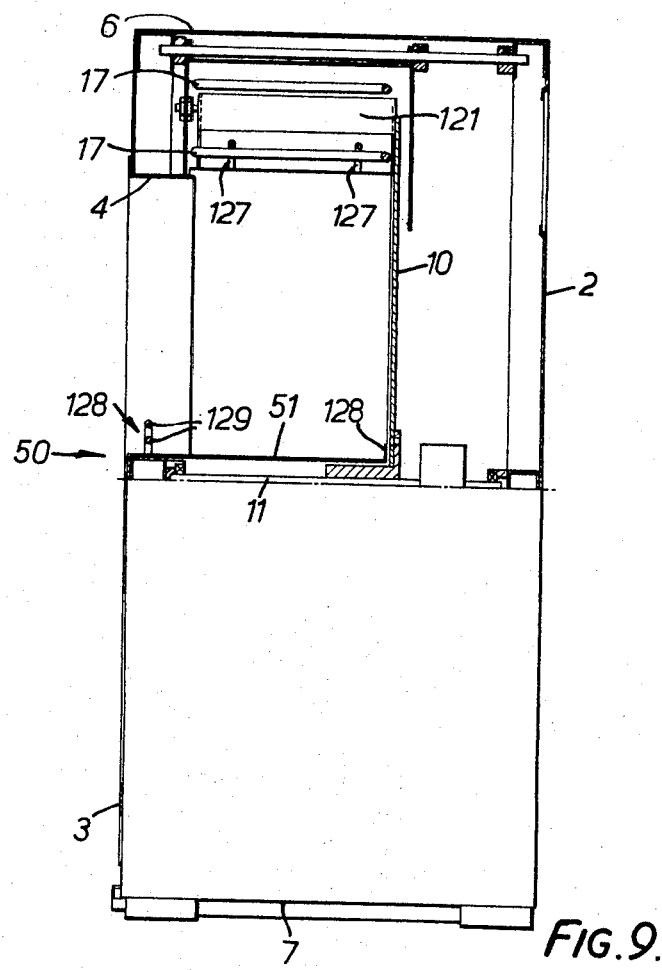
FIG. 9 is a view taken along the line B—B of FIG. 8.

Apparatus 120 shown in FIGS. 8 and 9 is a modification of the embodiment shown in FIGS. 1 and 2, and like reference numerals are used to indicate like parts.

As in the embodiment of FIGS. 1 and 2, a disc 10 is secured on a shaft 11 for rotation by a motor (not shown in FIGS. 8 and 9) within a housing comprising a back plate 2, a front plate 3 having a central circular aperture 4, a top plate 6, and bottom plate 7 and two side plates 5. However, whereas the drum-like structure of the toasting apparatus shown in FIGS. 1 and 2 comprises the disc 10 and 12 frames 20 spaced apart on the periphery thereof, which frames are each arranged to hold two slices of bread parallel to the disc 10 in a vertical position, the drum-like structure of the apparatus of FIGS. 8 and 9 comprises frames 121 arranged on the periphery of the disc to hold the slices of bread at right angles to the disc 10 in a horizontal position. Each frame 121 is adapted to hold only one slice of bread and although the throughput of the apparatus is thus half that of the embodiment shown in FIGS. 1 and 2 for each rotation of the disc 10, the horizontal disposition of the frames 121 advantageously allows the apparatus to be made much smaller in height and width.

Figure 10:
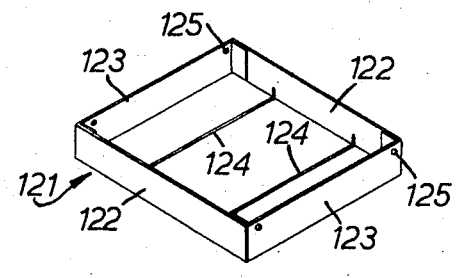
FIG. 10 is an isometric view of a frame of the apparatus shown in FIGS. 8 and 9.

As shown in FIG. 10, each frame 121 comprises two side plates 122 and two end plates 123 secured together in the form of a rectangle and two wire members 124 spaced parallel to the end plates and extending between the side plate to form a tray for receiving a slice of bread. Both end plates are provided with apertures 125, the apertures on one end plate receiving fixing members (not shown) securing the frame to the disc 10 and the apertures on the other end plate receive links 126 (FIG. 8) which fasten adjacent frames together.

As before, the apparatus has a loading section in the sector α, whereat slices of bread are loaded into the frames 121 from within the drum-like structure, a heating chamber 18 in the sector β, and an unloading station in the sector γ.

Figure 11:
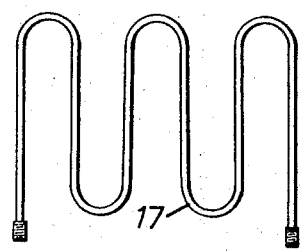
FIG. 11 is a plan of a heating element of the same apparatus.

The heating chamber 18 is provided with two heating elements 17, the formation of which is shown in FIG. 11, radially spaced apart to allow the frames 121 to pass therebetween. Typically, the radially outer heating element is rated at 1,500 watts and the radially inner element at 1,300 watts.

Two arcuate wires 127 extend over the sector β to prevent the slices of bread from falling out of the frames in that sector under gravity. The wires 127 do not extend into sector γ, and the bread in the frame in that sector is allowed to fall freely into the tray 50. No ejection of the bread is required. It will be noted that the tray 50 in the modified apparatus is adapted to receive the bread, which falls face-wise and not edge-wise as in FIGS. 1 and 2, and comprise a base 51 having two upright sides 128, the outer side of which comprises two vertically spaced retaining rails 129. The tray 50 is warmed by surplus heat from the elements 17.

The degree of toasting of the bread in the chamber 18 is controlled by the average speed of rotation of the disc 10. In the apparatus shown in FIGS. 8 and 9 the disc 10 is intermittently rotated by the motor driving the shaft 11, the supply to the motor being controlled through a microswitch (not shown) which is actuated by circumferentially spaced apart pegs (not shown) mounted on the disc 10. The disc 10 is rotated by the motor until the microswitch is actuated by one of the pegs, one peg being associated with each frame 121. The disc remains stopped for a predetermined time interval set by the control knob 130 of a delay timer (not shown). The time interval is typically set between 5 and 20 seconds and it will be appreciated from the respective lengths of the heating chamber 18 and frames 121 that each frame will stop twice in 1 revolution of the disc in the heating chamber for the preset time interval.

A three way switch 131 is provided to control the heaters 17 and the motor driving the disc 10, the three positions of the switch being respectively motor and heaters off; motor on, heaters off; and motor and heaters on.

It should be understood that the degree of toasting could alternatively be controlled by constantly rotating the disc 10 at a selected speed, which could be altered in the manner described in connection with the apparatus of FIGS. 1 and 2.

Whilst the apparatus shown in FIGS. 1 and 2 and FIGS. 8 and 9 have been described with reference to toasting slices of bread it will be appreciated that modifications can be made to make the apparatus suitable for toasting other foods. For example, it is sometimes desirable to toast the outside of a bun which has been pre-cut into two portions. To do this in the apparatus shown in FIGS. 1 and 2, the frames 20 are modified to hold the two portions of the bun with the cut surfaces thereof facing each other, and the two axially inner heating elements 17 are either omitted from the heating chamber 18 or rendered inoperative so that the cut surfaces of the bun portions are not toasted. In the apparatus shown in FIGS. 8 and 9, a separate bun portion is placed in each frame 121 with the cut surfaces of all the bun portions aligned to face one of the heating elements 17, which is arranged to be rendered inoperative whilst the other heating element remains operative, such that only the un-cut surfaces of the bun portions are toasted.

I claim:
1. A toasting apparatus, comprising
   a. a disc member mounted for rotation about a fixed axis;
   b. a plurality of frames circumferentially mounted on said disc member for rotation therewith, each of said frames being adapted to hold an item of food to be toasted, said frames being fixedly secured to the periphery of the disc member to form a drum-like structure therewith, said frames containing radially inwardly facing openings to permit items of food to be loaded from within the drum-like structure;
   c. drive means for rotating said disc member about said fixed axis;
   d. means defining a heating zone through which said frames successively pass during rotation of said disc member for toasting items of food loaded in said frames; and
   e. means defining an unloading station through which said frames successively pass following the passage thereof through said heating zone, thereby permitting removal of the items of food after toasting.

2. A toasting apparatus as claimed in claim 1, comprising control means for altering the degree of toasting of said items of food.

3. A toasting apparatus as claimed in claim 2, wherein said control means comprises means for varying the amount of heat in said heating zone.

4. A toasting apparatus as claimed in claim 2, wherein said control means comprises means for varying the average speed of rotation of said frames about said fixed axis.

5. A toasting apparatus as claimed in claim 4, wherein the drive means is arranged to rotate the carrier means disc member at a substantially constant speed, and the control means comprises means for selectively varying said constant speed.

6. A toasting apparatus as claimed in claim 5, wherein the control means comprises pre-selectable rotatable drive members arranged to transmit rotation from said drive means to said disc member through endless band means.

7. A toasting apparatus as claimed in claim 5, wherein said control means comprises a variable speed drive system.

8. A toasting apparatus as claimed in claim 5, comprising ejecting means including an ejector arranged to be driven in synchronism with the rotation of the disc member for ejecting said items of food from the frames as the pass through the unloading station.

9. A toasting apparatus as claimed in claim 4, wherein the drive means is arranged to rotate the disc member intermittently such that each frame is stationary in the heating zone for a predetermined period of time during each revolution of the disc member, and said control means comprises means for varying said predetermined period of time.

10. A toasting apparatus as claimed in claim 9, including switching means for controlling the operation of said drive means, and actuating means rotatable with said disc member carrier means for switching said switching means.

11. A toasting apparatus as claimed in claim 10, wherein said actuating means comprises a plurality of circumferentially spaced apart projections, each of which is associated with a respective frame and arranged to switch said switching means wereby the frames are indexed one at a time into the heating zone.

12. A toasting apparatus as claimed in claim 10, wherein said switching of said switching means is arranged to cause said drive means to stop rotating said disc member, and said control means comprises means for causing said drive means to restart said rotation after said predetermined period time.

13. A toasting apparatus as claimed in claim 12, wherein said drive means comprises an electric motor, said switching means is included in an electric supply circuit to the drive means such that switching of the switching means is arranged to cause an interruption of the electric supply to said electric motor, and said control means comprises an adjustable delay relay in said supply circuit for reconnecting said supply after a period of time predetermined by said delay relay.

14. A toasting apparatus as claimed in claim 9, comprising ejecting means including an ejector member arranged to eject said items of food from said frames when said frames are stationary in said unloading station.

15. A toasting apparatus as claimed in claim 1, wherein said disc member is arranged such that, in use, items of food are removed from said frames at the unloading station under the influence of gravity.

16. A toasting apparatus as claimed in claim 1, comprising ejecting means at said unloading station for ejecting said items of food from said frames.

17. A toasting apparatus as claimed in claim 1, wherein the frames are adapted to hold substantially flat items of food substantially parallel to said disc member.

18. A toasting apparatus as claimed in claim 17, wherein each frame is adapted to hold two flat items of food axially spaced apart.

19. A toasting apparatus as claimed in claim 17, wherein said heating zone has heating elements spaced apart for toasting both sides of the substantially flat items of food.

20. A toasting apparatus as claimed in claim 19, wherein said heating elements are controllable for toasting only one side of the substantially flat items of food.

21. A toasting apparatus as claimed in claim 1, wherein the frames are adapted to hold substantially flat items of food substantially at right angles to said disc member.

22. A toasting apparatus as claimed in claim 1, wherein said drum-like structure is mounted within a housing having an opening to allow the items of food to be loaded into said frames.

23. A toasting apparatus as claimed in claim 22, wherein the disc member is arranged to rotate about a substantially horizontal axis, the heating zone and the unloading station are situated in the upper region of the housing and a loading station is situated in the lower region thereof, and further comprising retaining means for retaining said items of food in the frames in the heating zone.

24. A toasting apparatus as claimed in claim 23, wherein said retaining means comprises at least one arcuate member extending adjacent the openings of the frames in the heating zone.

25. A toasting apparatus as claimed in claim 23, wherein a receiving means is arranged in said housing for receiving items of food from said unloading station.

26. A toasting apparatus as claimed in claim 25, wherein said receiving means comprises an elongate tray, extending horizontally in said housing.

* * * * *